United States Patent [19]

Lee

[11] Patent Number: 5,748,912
[45] Date of Patent: May 5, 1998

[54] USER-REMOVABLE CENTRAL PROCESSING UNIT CARD FOR AN ELECTRICAL DEVICE

[75] Inventor: Sherman Lee, Rancho Palos Verdes, Calif.

[73] Assignee: Advanced Micro Devices, Inc., Sunnyvale, Calif.

[21] Appl. No.: 489,864

[22] Filed: Jun. 13, 1995

[51] Int. Cl.$^6$ .................................................. H01J 13/00
[52] U.S. Cl. .................... 395/282; 395/281; 395/283; 395/306; 395/309; 395/500; 395/527
[58] Field of Search ............................. 395/281, 282, 395/283, 306, 308, 309, 500, 828, 830, 831, 835, 836, 800

[56] References Cited

U.S. PATENT DOCUMENTS

| | | | |
|---|---|---|---|
| 4,794,523 | 12/1988 | Adan et al. | 395/500 |
| 5,297,272 | 3/1994 | Lu et al. | 395/500 |
| 5,355,489 | 10/1994 | Bealkowski et al. | 395/700 |
| 5,410,726 | 4/1995 | Baqai et al. | 395/800 |
| 5,515,514 | 5/1996 | Dhuey et al. | 395/282 |
| 5,530,620 | 6/1996 | Sangveraphunsiri | 361/686 |
| 5,537,558 | 7/1996 | Fletcher et al. | 395/283 |
| 5,551,012 | 8/1996 | Chuang et al. | 395/500 |
| 5,555,510 | 9/1996 | Verseput et al. | 364/514 R |
| 5,579,487 | 11/1996 | Meyerson et al. | 395/282 |
| 5,581,712 | 12/1996 | Herrman | 395/283 |
| 5,586,270 | 12/1996 | Rotier et al. | 395/282 |
| 5,600,801 | 2/1997 | Parks et al. | 395/282 |

FOREIGN PATENT DOCUMENTS

| | | |
|---|---|---|
| 0 564 092 A3 | 2/1993 | European Pat. Off. |
| 94/00970 | 1/1994 | WIPO |

OTHER PUBLICATIONS

Schneider, F: So Gross Wie Eine Scheckkarte Single-Board-—Computer Mit Mikrocontroller SAB80C166, *Elektronik*, vol. 42, nop 23, 16 Nov. 1993, pp. 110–112.

Intel Corporation and Microsoft Corporation, *Plug and Play ISA Specification*, Version 1.0a, May 5, 1994, (Full Text).

PCI Special Interest Group, *PCI Local Bus Specification*, Review Draft, Revision 2.1, Oct. 21, 1994, (Full Text).

*PCI Mobile Design Guide*, Revision 1.0, Oct. 27, 1994, (Full Text).

PCI Special Interest Group, *Small PCI Information Packet*, Nov. 2, 1994, (Full Text).

PCI Special Interest Group, *Small PCI Local Bus Specification*, Draft Version 1.3, Apr. 18, 1995, (Full Text).

Section 1. *System Board*, (Prior to 1995), pp. 1-1 to 1-82.

Primary Examiner—Jack B. Harvey
Assistant Examiner—Raymond N. Phan
Attorney, Agent, or Firm—Skjerven, Morrill, MacPherson, Franklin & Friel; Omkar K. Suryadevara

[57] ABSTRACT

A user-removable CPU card includes a microprocessor and a bus bridge memory controller that allows the use of the microprocessor as a central processing unit of an electrical device (e.g. notebook PC or desktop PC). The user-removable CPU card includes a first connector that can be detachably coupled to a second connector in the electrical device, when the user-removable CPU card is inserted through an opening of the electrical device. When the electrical device is powered up subsequent to such insertion, the microprocessor on the user-removable CPU card functions as the central processing unit. Inclusion of a central processing unit of a computing device on a user-removable CPU card allows easy replacement of the CPU, for example, by simply opening a door and operating an eject mechanism, without disassembly of the housing. Therefore, a user can upgrade to a new central processing unit by simply ejecting a previously inserted user-removable CPU card and inserting a new user-removable CPU card, as easily as switching diskettes in the prior art (except for powering up the electrical device after such switching).

15 Claims, 10 Drawing Sheets

USER-REMOVABLE CENTRAL PROCESSING UNIT CARD FOR AN ELECTRICAL DEVICE

FIELD OF THE INVENTION

This invention generally relates to a user-removable card having a Central Processing Unit (CPU) and a bus bridge memory controller that allows the CPU to communicate with and control various system resources of an electrical device.

BACKGROUND OF THE INVENTION

Figure 1A:
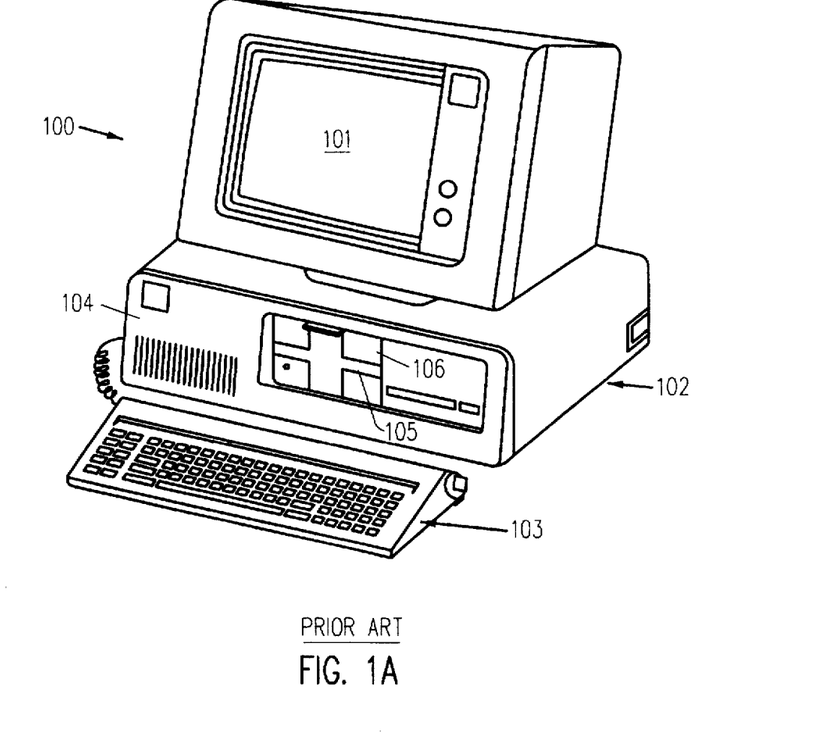
FIGS. 1A and 1B illustrate front and rear views respectively of a prior art desktop personal computer.

FIG. 1A illustrates a prior art desktop personal computer (e.g. IBM™ PC) 100 that includes a monitor 101, a system chassis 102 and a keyboard 103. System chassis 102 includes a number of boards (not shown in FIG. 1A) that are enclosed by housing 104. While housing 104 has an opening 105 for insertion of a floppy disk (not shown) into a disk drive 106, the user must perform a number of inconvenient, clumsy and time consuming actions to install a board, for example to add fax-modem functionality.

Figure 1B:
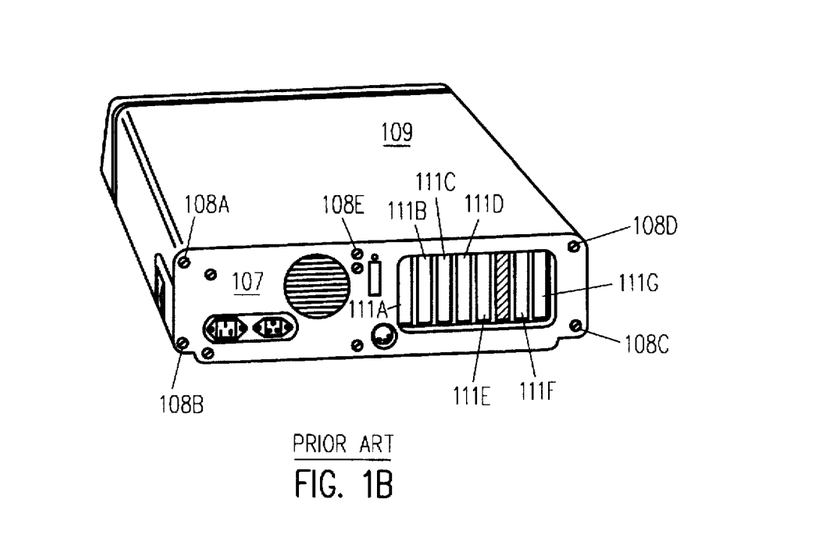
Figure 1C:
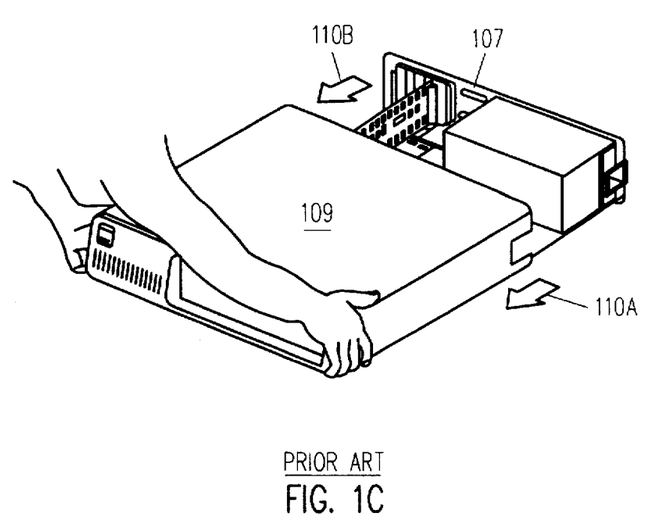
FIGS. 1C and 1D illustrate the removal of the cover of the system chassis of the personal computer of FIGS. 1A and 1B.
Figure 1D:
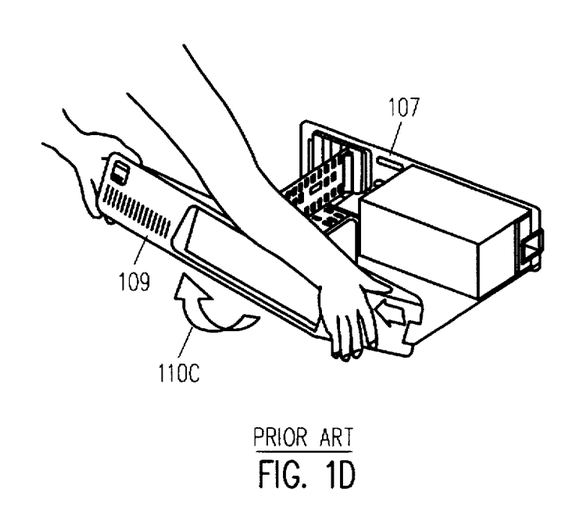

To install such a board, the user must first access rear panel 107 (FIG. 1B), to remove screws 108A–108E using a screwdriver. Then the user must pull cover 109 (FIG. 1C) straight forward in the direction of arrows 110A and 110B and then lift cover 109 upward in the direction of arrow 110C (FIG. 1D). During cover removal, the user must take care to ensure that any cables inside system chassis 102 are not caught in a catch (not shown) of cover 107.

The user must then remove an oblong plate, such as one of dust plates 111A–111G (better shown in FIG. 1B) that are used to keep out dust, by taking out a screw (not shown) that holds the dust plate in place on rear panel 107. Then the user must insert a plug connector (not shown) of a new board into a socket connector such as one of socket connectors J1–J14 of system board 113 (FIG. 1E) and also fasten the new board's rear plate to rear panel 107 with the screw that held the removed dust plate.

Figure 1E:
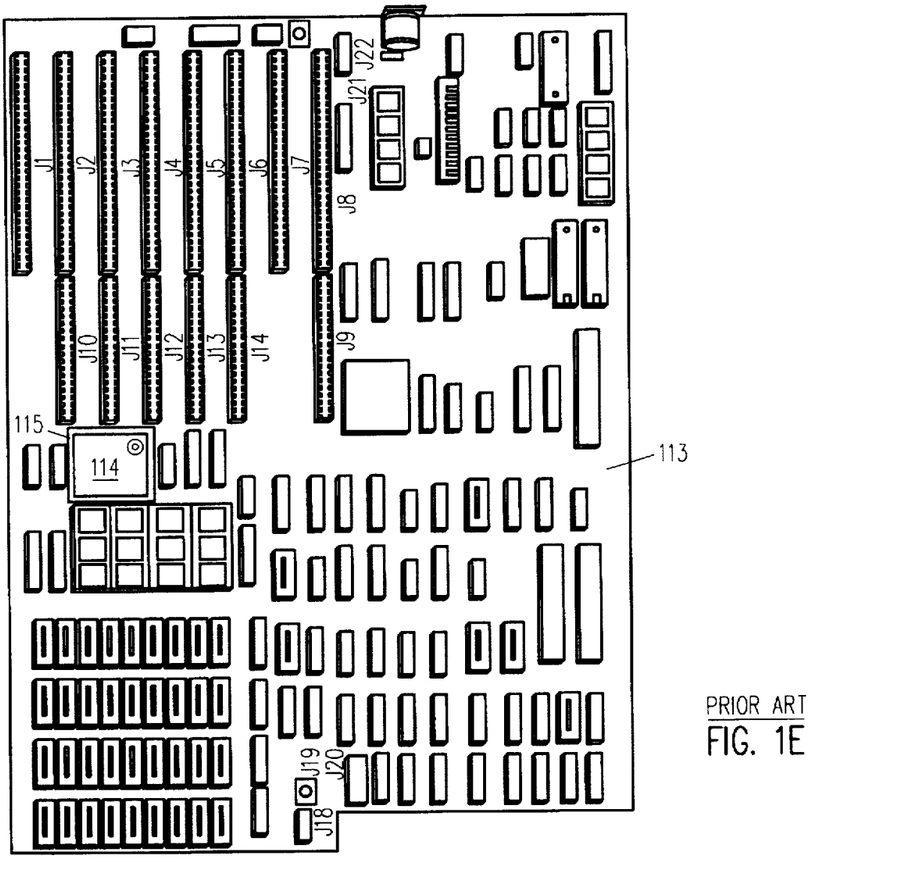
FIG. 1E illustrates the system board mounted inside system chassis of FIGS. 1A–1D.

To install a new central processing unit (CPU), the user performs similar steps as described above. However, instead of inserting a new board, the user must pull out an old CPU chip 114 from an integrated circuit (IC) socket connector 115 on system board 113 and insert the new CPU chip in IC socket connector 115. Such replacement of CPU chips is not possible if old CPU chip 114 is soldered to system board 113 or if old CPU chip 114 has a pin-out different from the pin-out of the new CPU chip. In such a case, system board 113 must be replaced, using at least a screwdriver.

Figure 1F:
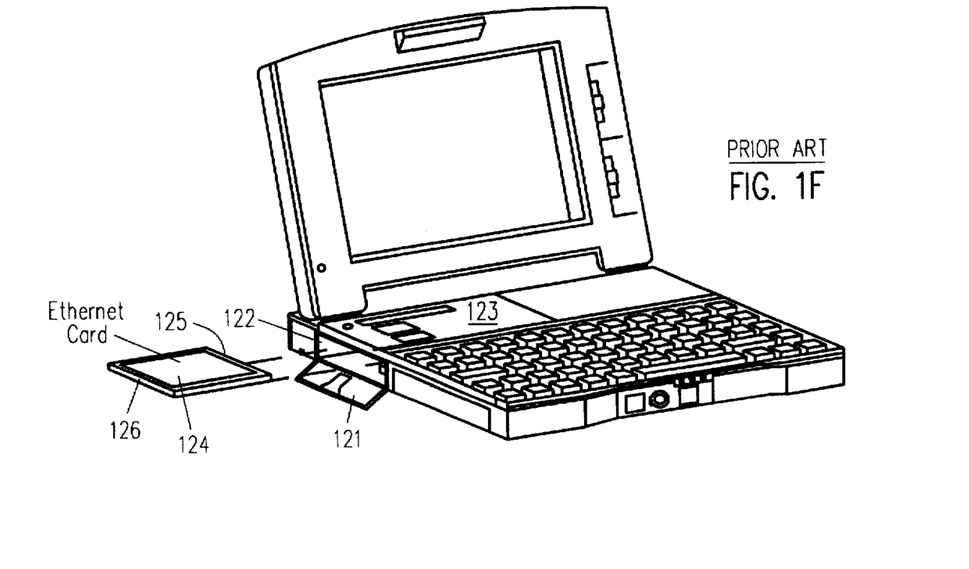
FIG. 1F illustrates a prior art notebook personal computer that has a PCMCIA socket for a PCMCIA card.

FIG. 1F illustrates an intuitive, easy and simple way to install or replace peripherals and memory in a prior art notebook PC 120. A user simply opens a door 121 to expose an opening 122 in housing 123 and inserts a personal-computer-memory-card-international association (PCMCIA) card 124 of the type described in "PC Card Standard" available from PCMCIA, 1030 East Duane, Suite G, Sunnyvale, Calif. 94086, Phone 1-408-720-0107 and that is incorporated herein by reference in its entirety. In the example of FIG. 1F, PCMCIA card 124 is an ethernet card having a PCMCIA plug connector 125 at one end for user-removable connection to a PCMCIA socket connector (not shown) in opening 122. PCMCIA card 124 also has an adapter connector 126 located opposite to plug connector 125 for connection to ethernet cables.

Therefore installing a peripheral in notebook PC 120 is as easy as inserting a floppy disk into a disk drive of a desktop PC. The user does not need to perform any of the clumsy actions described above in reference to FIGS. 1A–1E.

A number of PCMCIA cards are available, such as mass storage cards, network cards and fax-modem cards, all of approximately the same length and width as a credit card.

However, to install or replace a central processing unit (CPU) of notebook PC 120, a user must still perform clumsy actions of the type described above in reference to FIGS. 1A–1E. Such user actions are made even more difficult because of space constraints inherent in notebook PC 120.

SUMMARY

In accordance with this invention, a central processing unit (CPU) and a bus bridge memory controller are included in a user-removable central processing unit card that has a modular design with a form factor similar to that of a credit card to allow a user to carry the user-removable CPU card in, for example, a wallet or a shirt pocket. The user-removable CPU card includes a first connector that is (1) permanently coupled to the CPU through a bus bridge memory controller and (2) capable of user-removable connection to a second connector in a system board of an electrical device, such as a computing device (e.g. a notebook PC or a desktop PC) on insertion of the user-removable CPU card through a slot in the housing of the electrical device.

When the electrical device is powered up subsequent to such insertion, the system board supplies power to the CPU in the user-removable CPU card through the first and second connectors. On receipt of power from the system board, the CPU powers up, reads resource data (such as requirements of input-output addresses, interrupt lines and direct-memory-access channels) from one or more system resources, checks conflict in resource assignment, activates the system resources, performs power on self test (POST) and boots the operating system. Thereafter the CPU in the user-removable CPU card continues to perform typical CPU functions to control system resources, for example enables or disables system resources as necessary, sends commands to and receives status from enabled system resources, presents information on a display and responds to interrupts from a keyboard.

Inclusion of a bus bridge memory controller on the user-removable CPU card as described herein isolates the system board and various system resources of the electrical device from, for example, attributes of a CPU that are specific to a CPU manufacturer, such as pin-out of a microprocessor chip that contains the CPU.

This invention allows easy replacement of a CPU, for example, by simply opening a door in the housing of an electrical device, disconnecting a preexisting user-removable CPU card and inserting a new user-removable CPU card, without the prior art need for disassembly of the housing. For example, when a fast CPU, such as AMD™'s K5™ microprocessor becomes available, a user can upgrade an electrical device of the type described herein that contains Intel™'s Pentium™ microprocessor by simply switching user-removable CPU cards containing the respective microprocessors. Therefore, a user can upgrade to a new CPU, irrespective of the CPU implementation in a single integrated circuit, a multi-chip module or a chip set and also irrespective of the pin-out of an integrated circuit that contains the CPU. A user can also upgrade to a CPU of a lower or higher generation if such a CPU is included in a user-removable CPU card of the type described herein.

The credit card size of the user-removable CPU card described herein provides several advantages not present in larger sized system boards of the prior art. The credit card size is a critical dimension that permits a user to easily carry the user-removable CPU card in a small space, such as a wallet or a pocket. Moreover, a credit card size is useful and essential for notebook and palmtop PCs, where space is a severe constraint. For example, a notebook PC as described herein can easily accommodate two or more CPU cards and yet have the same dimension as a prior art notebook PC containing a single CPU; whereas the space requirements of a notebook PC containing two prior art system boards can be twice that of a single prior art notebook PC. The credit card size also allows the user-removable CPU card to have a small weight, again facilitating its use in notebook and palmtop PCs and easy transportation of one or more CPU cards in a user's wallet or pocket.

In one embodiment, the user-removable CPU card has read-only-memory (ROM) encoded with basic-input-output system (BIOS) instructions that are executed by the CPU in the user-removable CPU card following power up. The BIOS instructions include system configuration BIOS instructions that when executed cause the CPU to check for conflict in assignment of resources of the electrical device. Such system configuration BIOS instructions allow user-removable CPU cards containing CPUs of different architectures to be successively used in the same electrical device because a CPU in the user-removable CPU card configures system resources in the electrical device following each power up of the electrical device.

Therefore in accordance with this invention, the user can switch between CPUs having incompatible architectures, to run application programs specific to each architecture. For example, a user can initially use a user-removable CPU card containing an x86 CPU in a notebook PC to run, for example, Microsoft™ Windows™ operating system and Windows™ specific applications such as Microsoft™ Word to edit text documents. At some later point in time, the user can switch off power to the notebook PC, exchange user-removable CPU cards for example by replacing the x86 CPU with a 680x0 CPU in the same slot of the notebook PC and switch on power to the notebook PC to run Apple™ Macintosh™ operating system and Macintosh™ specific applications such as Macpaint to edit picture documents. Therefore the invention provides flexibility in sequential use of CPUs of different architectures in the same electrical device.

In accordance with this invention, the user can also simultaneously run two or more applications on CPUs of different architectures located within the same electrical device and dynamically switch between these CPUs by just a keystroke or a mouse button click.

In this embodiment, the user-removable CPU card also has random-access-memory (in the form of cache memory SRAM chips and main memory DRAM chips) that can be loaded with application programs and data from a storage media such as an Integrated Device Electronics (IDE) hard drive, to allow the electrical device to perform various selected functions (e.g. spreadsheet calculations).

In addition to the CPU and the memory (e.g. ROM and optional RAM), a user-removable CPU card of this invention also includes a bus bridge memory controller. The bus bridge memory controller and the CPU are included in a single integrated circuit in one embodiment and are included in two or more integrated circuits in other embodiments. The bus bridge memory controller includes a bus interface unit that interfaces the CPU through the first and second connectors to a system bus in the electrical device. The bus bridge memory controller includes an interrupt translator that responds to an active signal on an interrupt line of the system bus by driving an interrupt signal active on a corresponding interrupt terminal of the CPU. The bus bridge memory controller also includes a memory controller that interfaces the CPU to the read-only-memory (ROM) encoded with BIOS instructions. In various embodiments, a bus bridge memory controller can optionally include several central resources, such as a clock controller, a bus arbitrator, and interface (e.g. in the memory controller) to random access memory.

In one specific embodiment, the bus bridge memory controller includes a thermal monitor that periodically samples a temperature signal from a thermistor also included on the user-removable CPU card. In response to the temperature signal exceeding a predetermined high limit, the bus bridge memory controller supplies to the CPU a clock signal that has a predetermined frequency smaller than a predetermined normal operating frequency. In response to the temperature signal falling below a predetermined low limit, the bus bridge memory controller supplies to the CPU a clock signal at the normal operating frequency. In this manner, the bus bridge memory controller prevents permanent damage to the CPU that may be otherwise caused by poor dissipation of heat from the user-removable CPU card.

The "user-removable" feature of a user-removable CPU card described herein provides high degree of configurability, high performance capability and low cost. Due to modular design of the user-removable CPU card, the system board and hence the electrical device can have fewer versions, and can be manufactured in high volumes, thereby reducing production costs, such as tooling setup and testing costs. Such a modular design of the user-removable CPU card also allows fewer parts of an electrical device to be stocked in accordance with just in time manufacturing methods and allows flexible customized fabrication of electrical devices, irrespective of the CPU architecture. The modular design also simplifies assembly of electrical devices because no wires need be connected, rather a CPU card can be simply inserted into the electrical device through an opening in the housing. In fact, this assembly step can be done by a user rather than for example, a manufacturer of the electrical device.

DETAILED DESCRIPTION

Figure 2A:
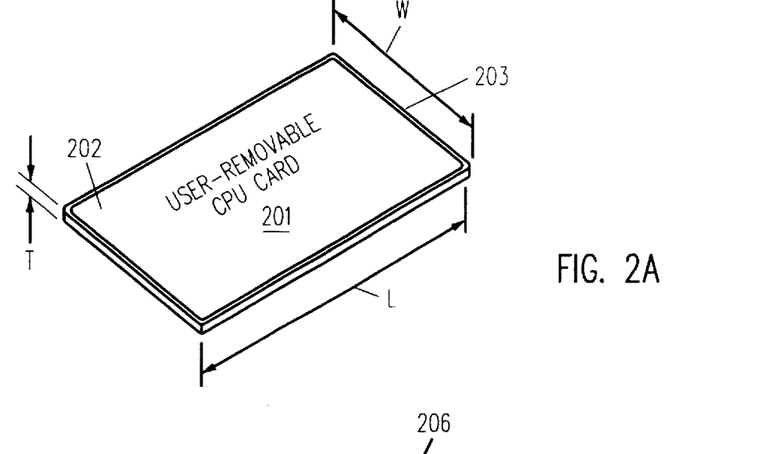
FIGS. 2A and 2C illustrate in perspective views, two embodiments of a user-removable CPU card that includes a microprocessor.

FIG. 2A illustrates one embodiment of a user-removable central processing unit (CPU) card (also called "CPU card") 201 having a housing 202 that encloses a central processing unit (CPU) mounted on a substrate as described below. Housing 202 has a width W and a length L that are approximately the same as those of a credit card, so that a user can easily carry CPU card 201 in a conventional wallet. Thickness T of housing 202 is not a critical dimension of this invention. Also, length L can be varied for different CPU cards of one embodiment, but width W is a critical dimension that is kept approximately identical to allow the different CPU cards to be used interchangeably. In one specific embodiment, width W=5.40 cm, length L=8.56 cm and thickness T=0.5 cm (T=1.05 cm in another embodiment).

Figure 2B:
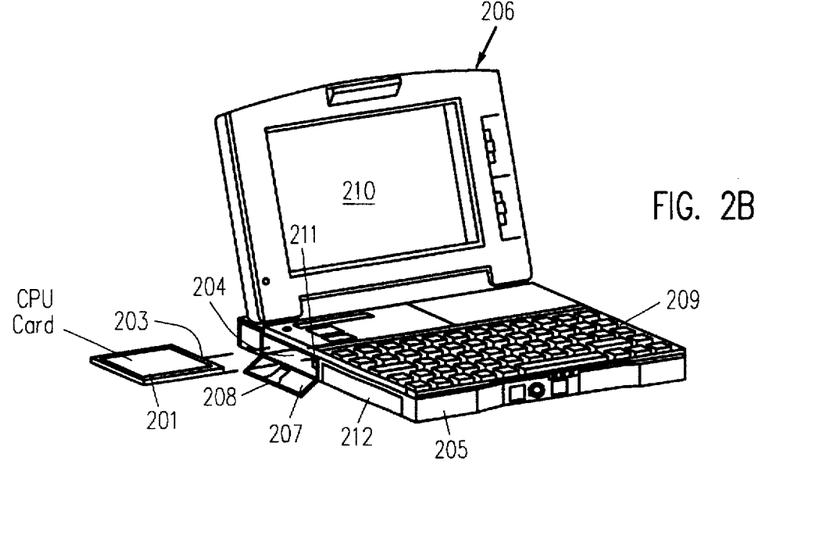
FIG. 2B illustrates the use of the CPU card of FIG. 2A in a notebook PC in accordance with this invention.
Figure 3A:
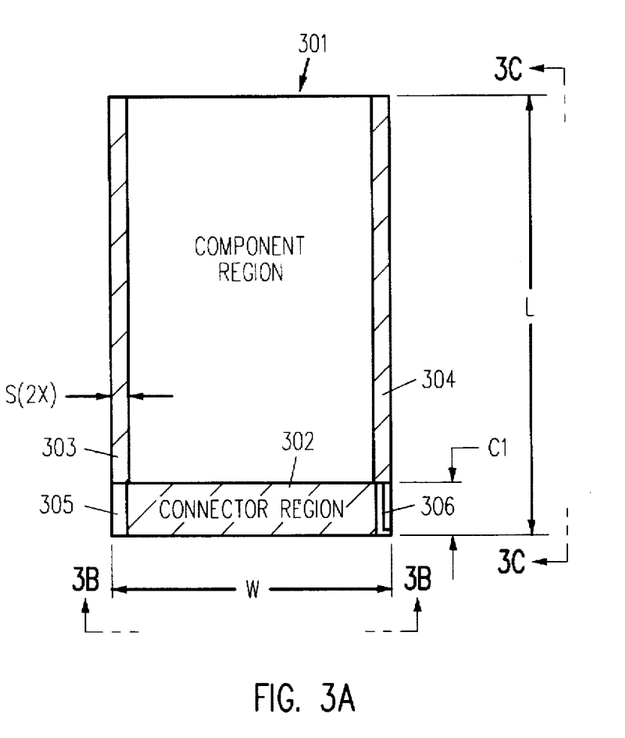
FIGS. 3A, 3B and 3C illustrate in plan, elevation and side views, the physical dimensions of one embodiment of a user-removable CPU card.
Figure 3B:
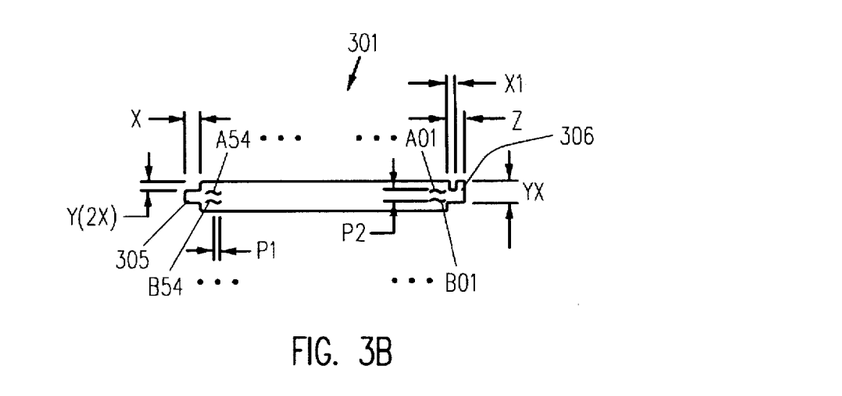

CPU card 201 also includes a connector 203 that is in this embodiment a socket connector having a number of socket contacts (shown in FIG. 3B). On insertion of CPU card 201 into a bay through a slot 204 in a housing 205 of an electrical device, such as notebook PC 206 (FIG. 2B), connector 203 is detachably and electrically coupled with a corresponding connector in a system board (shown in FIG. 5) of notebook PC 206. Housing 205 (FIG. 2B) includes a door 207 that can be opened to allow access to the bay behind slot 204. In one embodiment, during normal operation of notebook PC 206, door 207 is closed and locked by a locking mechanism 208 except when CPU card 201 is being inserted into or removed from notebook PC 206, to prevent accidental disconnection of CPU card 201. Disconnection of CPU card 201 during normal operation of notebook PC 206 can result in unpredictable and unforseen events (also called "errors") in notebook PC 206, and is therefore to be avoided.

When notebook PC 206 is powered up, the system board supplies power to CPU card 201 through connector 203 and on receipt of power the CPU in card 201 configures and controls various system resources of notebook PC 206. As is well known in the art of computer engineering, a central processing unit can perform various operating system functions such as: (1) executing selected application software in response to user input through for example keyboard 209; (2) presenting useful information to the user on, for example, display 210; and (3) controlling resource agents, for example by monitoring status, issuing commands and responding to interrupts from various system resources. As used herein, an agent is any portion of an electrical device that is controlled by a central processing unit of the electrical device, and can be for example a PCI agent.

As an optional feature of one specific embodiment, notebook PC 206 includes inside slot 204 an eject mechanism 211 that can be operated by a user to eject an inserted CPU card 201. In addition to door 207, notebook PC 206 has another door 212 shown in the closed position in FIG. 2B, that can be opened for insertion of another user-removable card similar to CPU card 201. Such a user-removable card can be, for example, a resource card that contains a system resource, such as a fax-modem controller, or can also be another CPU card for example, to allow a user to switch on a keystroke between different operating systems, such as Windows™ and Macintosh™ operating systems.

In one embodiment, CPU cards have only a CPU and associated circuitry as described herein while resource cards have only system resources i.e. no system resources are present on a CPU card and no CPUs are present on a resource card. In such an embodiment, a resource card (e.g. an ethernet card) can have a microprocessor that is dedicated to performing various functions of the resource card and that cannot perform operating system functions typically performed by a CPU for the entire electrical device. Also in such an embodiment, a resource card can have a read-only-memory encoded with BIOS instructions that are moved to a main memory (e.g. DRAM chips 406) on a CPU card during system configuration and executed by the CPU (e.g. CPU 402). Such BIOS instructions are not executed by a microprocessor in the resource card of this embodiment.

Although an electrical device has been illustrated in one embodiment in FIG. 2B as notebook PC 206, in another embodiment the electrical device can be any other electrical device such as a desktop PC similar to the one illustrated in FIG. 1A, but having appropriate features such as those described below for a system board. An electrical device in accordance with this invention uses a central processing unit to provide enhanced functionality, and includes embedded control devices for example, a building controller that controls security and air conditioning of a building, a vehicle controller that controls the air fuel ratio of an engine and a television set top that allows a user to select programming presented on a television.

Figure 2C:
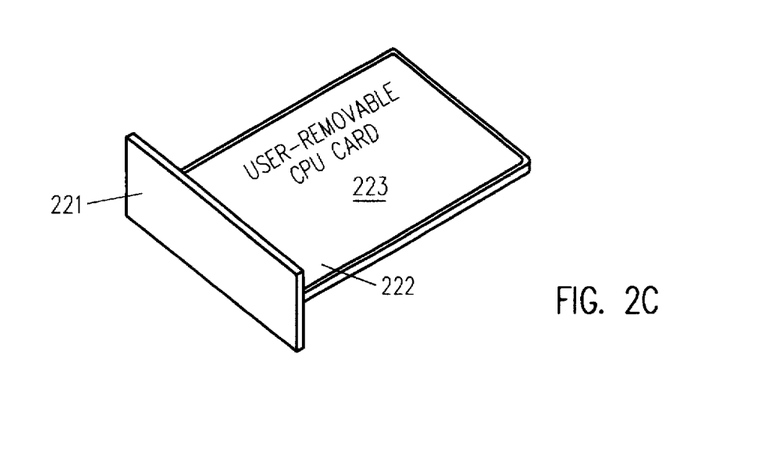

Door 207 (FIG. 2B) is not a critical component in an electrical device of this invention, and is not provided in some embodiments. For example, one embodiment of a user-removable card 223 (FIG. 2C) has a door 221 that is part of housing 222 of card 223. Card 223 is otherwise similar in all respects to CPU card 201 described above. User-removable card 223 can be used with an electrical device having an opening that is closed by door 221. Door 221 can be locked when card 223 is fully inserted into a slot behind the opening.

The form factor of user-removable card 201 in one embodiment is the same as that described in "PC Card Standard" for PCMCIA cards (above). In one specific embodiment, user-removable card 201 complies with the specification for a Small Peripheral Component Interconnect (SPCI) card, as described in "Small PCI Local Bus Specification" (henceforth "SPCI Specification"), available from PCI Special Interest Group, M/S HF3-15A, 5200 N.E. Elam Young Parkway, Hillsborough, Oreg. 97124-6497, which is incorporated herein by reference in its entirety.

In one embodiment, a substrate 301 (FIGS. 3A–3C) that is enclosed by housing 202 of user-removable CPU card 201 (FIG. 2A) is a printed circuit board substrate having a width W approximately the same as the width of a credit card. Substrate 301 has a connector region 302 at one edge (adjacent to connector 203) and clearance regions 303 and 304 at the longitudinal edges. Substrate 301 has two keyed edge guides 305 and 306 along the longitudinal edges adjacent connector region 302 for insertion polarization. Substrate 301 includes a number of contacts such as socket contacts A01 ... A54 arranged in a first row A and socket contacts B01 ... B54 arranged in a second row B parallel to first row A in connector 203 (FIG. 3B). Two adjacent socket contacts of a row are separated from each other by a distance pi. The two rows A and B are separated from each other by a distance p2.

Figure 3C:
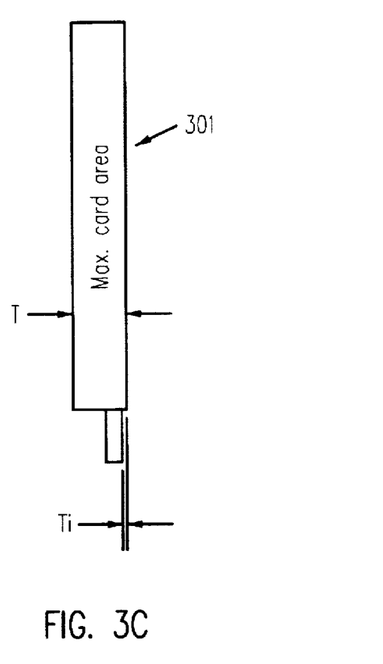

In one specific embodiment, the dimensions illustrated in FIGS. 3A–3C are listed in Table 1 below, and are described in detail in the above-referenced SPCI Specification.

TABLE 1

| DIMENSION in FIGS. 3A–3C | MILLIMETERS |
|---|---|
| L | 85.6 |
| S | 3 |
| Tk | 3.3 |
| T | 10.5 |
| X | 2.6 |
| X1 | 1.3 |
| Y | 1.1 |
| Z | 2.6 |
| C1 | 10.0 |
| W | 54 |
| Ti | 0.85 |
| p1 | 0.8 |
| p2 | 1.0 |

Signal definitions for 108 socket contacts (54 in each row) in two embodiments (e.g. 5 volt and 3.3 volt) of connector 203 are listed in Table 2 below and described in the above-referenced SPCI Specification.

TABLE 2

| | SIGNAL DEFINITIONS | |
|---|---|---|
| Contact | Row B | Row A |
| 1 | Ground | Ground |
| 2 | INTB# | +12V |
| 3 | +5V | INTA# |
| 4 | INTD# | INTC# |
| 5 | −12V | +5V |
| 6 | PRSNT1# | Reserved |
| 7 | Reserved | Reserved |
| 8 | PRSNT2# | +5V |
| 9 | CLK | RST# |
| 10 | Ground | GNT# |
| 11 | REQ# | Ground |
| 12 | +5V | CLKRUN# |
| 13 | AD[31] | AD[30] |
| 14 | AD[29] | +5V |
| 15 | Ground | AD[28] |
| 16 | AD[27] | AD[26] |
| 17 | AD[25] | Ground |
| 18 | +I/OV | AD[24] |
| 19 | Reserved | +I/OV |
| 20 | Ground | Reserved |
| 21 | C/BE[3]# | Ground |
| 22 | +3.3V | IDSEL |
| 23 | AD[23] | +3.3V |
| 24 | Ground | AD[22] |
| 25 | AD[21] | AD[20] |
| 26 | AD[19] | Ground |
| 27 | +3.3V | AD[18] |
| 28 | AD[17] | AD[16] |
| 29 | C/BE[2]# | +3.3V |
| 30 | Ground | FRAME# |
| 31 | IRDY# | Ground |
| 32 | +3.3V | TRDY# |
| 33 | DEVSEL# | Ground |
| 34 | Ground | STOP# |
| 35 | LOCK# | +3.3V |
| 36 | PERR# | SDONE |
| 37 | Ground | SBO# |
| 38 | SERR# | Ground |
| 39 | +3.3V | PAR |
| 40 | C/BE[1]# | AD[15] |
| 41 | AD[14] | +3.3V |
| 42 | Ground | AD[13] |
| 43 | AD[12] | AD[11] |
| 44 | AD[10] | M66EN |
| 45 | +I/OV | AD[09] |

TABLE 2-continued

| | SIGNAL DEFINITIONS | |
|---|---|---|
| Contact | Row B | Row A |
| 46 | AD[08] | C/BE[0]# |
| 47 | AD[07] | +I/OV |
| 48 | +5V | AD[06] |
| 49 | AD[05] | AD[04] |
| 50 | AD[03] | +5V |
| 51 | +5V | AD[02] |
| 52 | AD[01] | AD[00] |
| 53 | ACK64# | Ground |
| 54 | Ground | REQ64# |

The socket contacts labeled +I/OV are connected in substrate 301 to the +5V plane in a 5 volt embodiment and alternatively to the +3.3V plane in a 3.3 volt embodiment. Signal definitions in Table 2 are similar or identical to the definition of PCI signals described in "PCI Local Bus Specification" (henceforth "PCI Specification"), May 15, 1995, that is also available from PCI Special Interest Group (above) and that is incorporated by reference herein in its entirety.

Figures 4A, 4B:
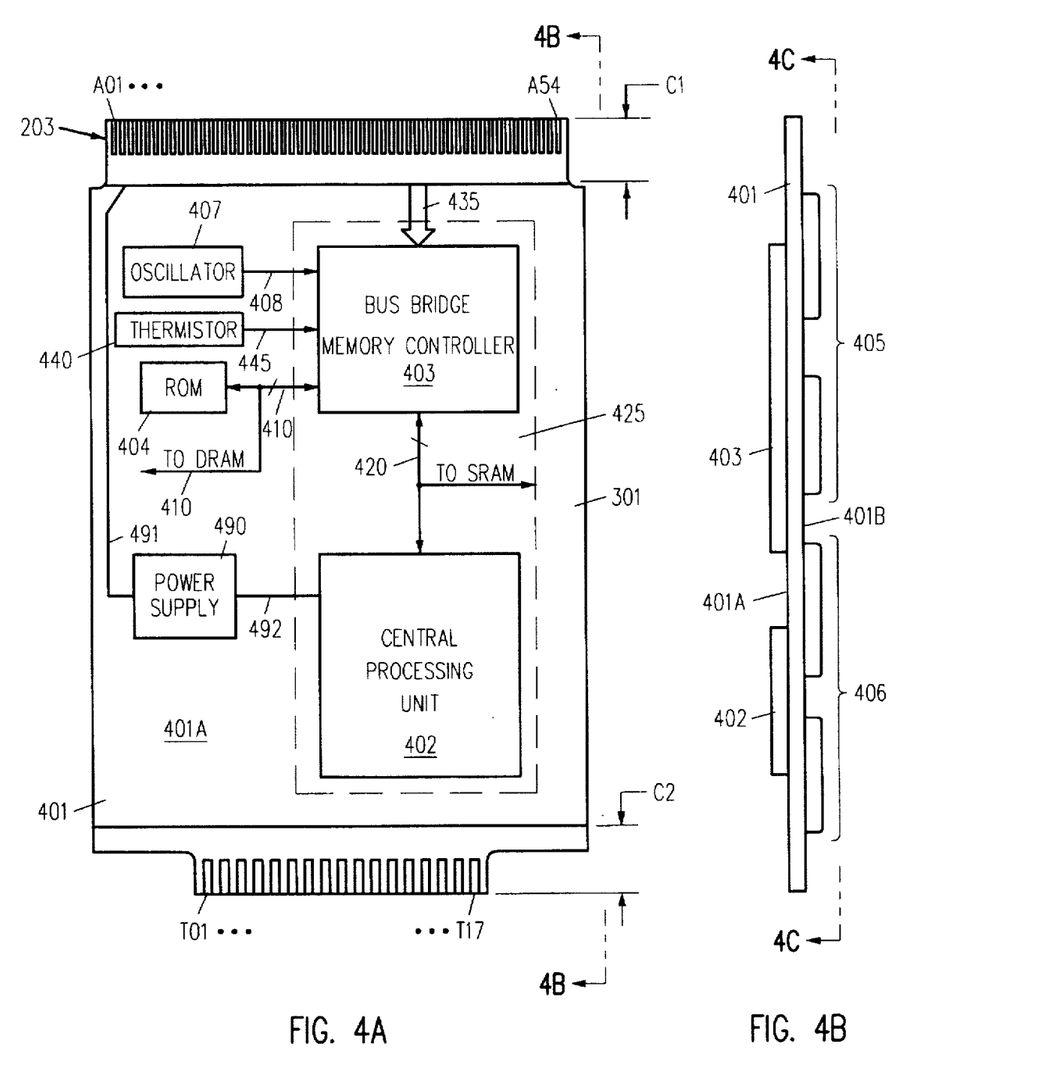
FIGS. 4A, 4B and 4C illustrate in top plan, side and bottom plan views, a substrate included in the user-removable card of FIGS. 3A–3C.
Figure 4C:
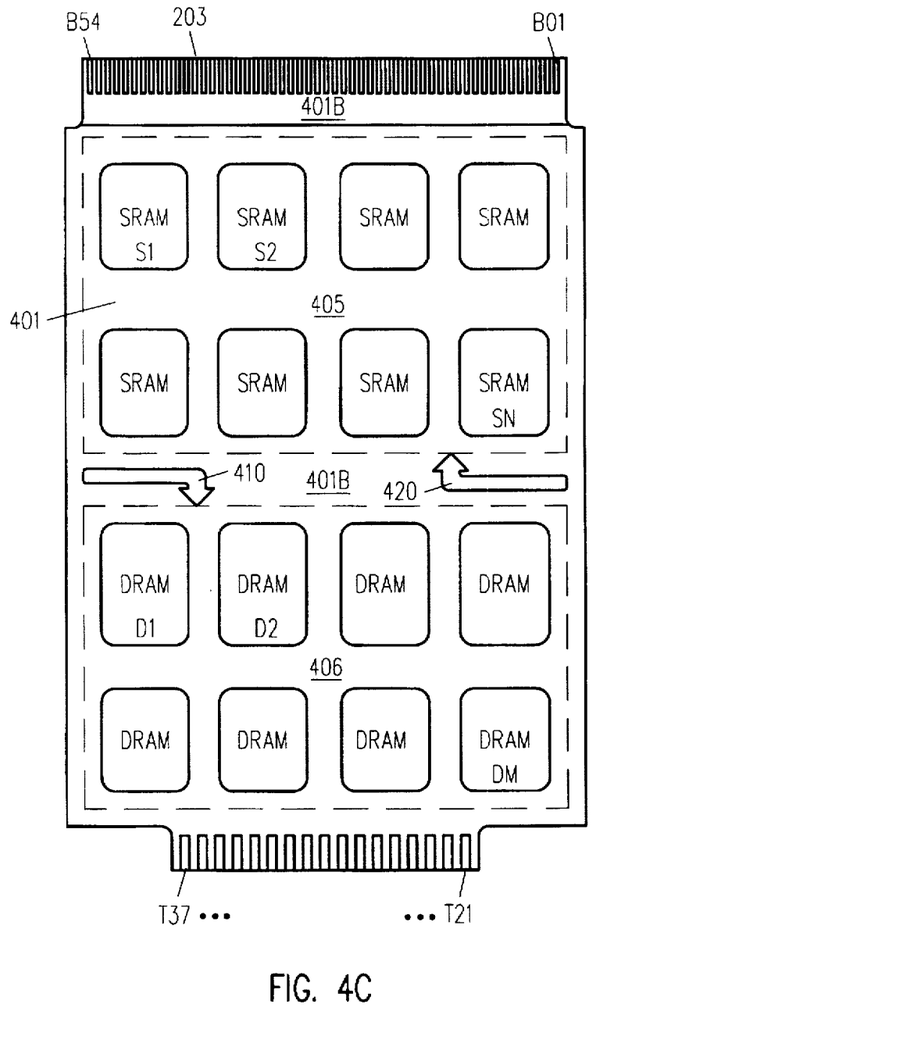

Another embodiment of a substrate 401 that is similar to substrate 301 is illustrated in FIGS. 4A–4C, along with various components of user-removable CPU card 201. Substrate 401 supports a CPU 402 coupled to a bus bridge memory controller 403 that is in turn coupled to read-only-memory (ROM) 404. In this embodiment, to minimize complexity in circuit layout, bus bridge memory controller 403 is located adjacent connector 203. For the same reason, in this embodiment, CPU 402, bus bridge memory controller 403 and ROM 404 are surface mounted on the same side 401A of substrate 401.

Bus bridge memory controller 403 is also coupled to a number of SRAM chips S1, S2, . . . SN, where N is the number of SRAM chips (FIG. 4C) that function together as a cache 405 and to a number of DRAM chips D1, D2, . . . DM, where M is the number of DRAM chips that function together as a main memory 406. SRAM chips S1, S2, . . . SN and DRAM chips D1, D2, . . . DM can be mounted on the same side 401A (FIG. 7) as CPU 402 or on an opposite side 401B as shown in FIGS. 4A–4C. Same side mounting of all components costs less but results in a larger length L of card 201, as width W remains fixed irrespective of the circuit layout.

Also mounted on substrate 401 are a number of other components, such as oscillator 407 (FIG. 4A) that drives a clock signal over an electrical conductor, such as metal trace 408 to bus bridge memory controller 403.

Substrate 401 also has a number of additional electrical conductors, for example, metal traces 410 (also called memory bus 410) that couple ROM 404 and DRAM 406 to bus bridge memory controller 403 and metal traces 420 (also called CPU bus 420) that couple CPU 402 and SRAM 405 to bus bridge memory controller 403. Bus bridge memory controller 403 is also coupled by a number of metal traces 435 to connector 203. In the embodiment of FIGS. 4A–4C, substrate 401 also has a number of test contacts T01 . . . T37 that are used for testing of CPU card 201, for example after manufacture and prior to shipment.

Bus bridge memory controller 403 isolates CPU 402 from the rest of the components in notebook PC 206 and therefore allows CPUs of different architectures to be used in the same notebook PC 206, sequentially and also simultaneously depending on the embodiment.

In one specific embodiment, substrate 401 includes a thermistor 440 that is connected by a temperature line 445 to bus bridge memory controller 403. Bus bridge memory controller 403 periodically samples the signal from thermistor 440 and compares the sampled temperature measurement against a predetermined upper limit e.g. 85° C. When the temperature indicated by thermistor 440 starts approaching the predetermined upper limit, bus bridge memory controller 403 reduces the frequency of the clock signal supplied at one of control terminals 402C of CPU 402 on CPU bus 420 to a predetermined low frequency e.g. 10 MHz until the sampled temperature measurement falls below a predetermined lower limit e.g. 25° C. Once the temperature falls below the predetermined lower limit, bus bridge memory controller 403 again supplies the clock signal to central processing unit 402 at a predetermined normal frequency e.g. 90 MHz. In this manner, the bus bridge memory controller 403 ensures that the thermal limit of the central processing unit 402 is not exceeded. Although the clock signal supplied to CPU 402 is slowed down to avoid CPU overheating, other clock signals (such as the DRAM refresh signal) can be maintained at the same frequency (except if self refresh DRAMs are used).

Substrate 401 can also include in one embodiment as an optional feature, a power supply 490 that receives power from a line 491 connected to a power contact (e.g. Contact 3 of Row B) of connector 203 and distributes power to various components of CPU card 201, which may have different power requirements from each other. For example, in one specific embodiment, power supply 490 receives power on line 491 at 5 volts and in turn supplies power at 3.3 volts on line 492 to CPU 402.

In one specific embodiment, CPU 402 is a Am486™ microprocessor available from AMD™, One AMD Place, P.O. Box 3453, Sunnyvale, Calif. 94088-3453. In this embodiment, ROM 404 is Am27C1024 also available from AMD (above) while DRAM chips D1–DM and SRAM chips S1–SN are respectively MT4C161024 and MT5C128K8A1 available from Micron Technology, 2805 E. Columbia Road, Boise, Id. 83706. In this embodiment SRAM chips S1–SN form 1M Bytes of cache memory 405 and DRAM chips D1–DM form 16M Bytes of main memory 406. Also in one embodiment, substrate 401 is thin laminate multi-layer FR-4 with 0.8 mm (about 20 mils) thickness; and connector pad co-planarity is approximately 0.10 mm.

In one embodiment central processing unit 402 and bus bridge memory controller 403 are formed as two different integrated circuits, such as a microprocessor chip (e.g. 80x86 chip, 680x0 chip, Alpha chip, a Power PC chip, a SPARC chip or a MIPS chip) and a logic chip (e.g. PAL™ chip or FPGA chip). In another embodiment CPU 402 and bus bridge memory controller 403 are formed together in a single integrated circuit as two portions that are connected to each other by electrical conductors 420 formed within the single integrated circuit.

Figure 5:
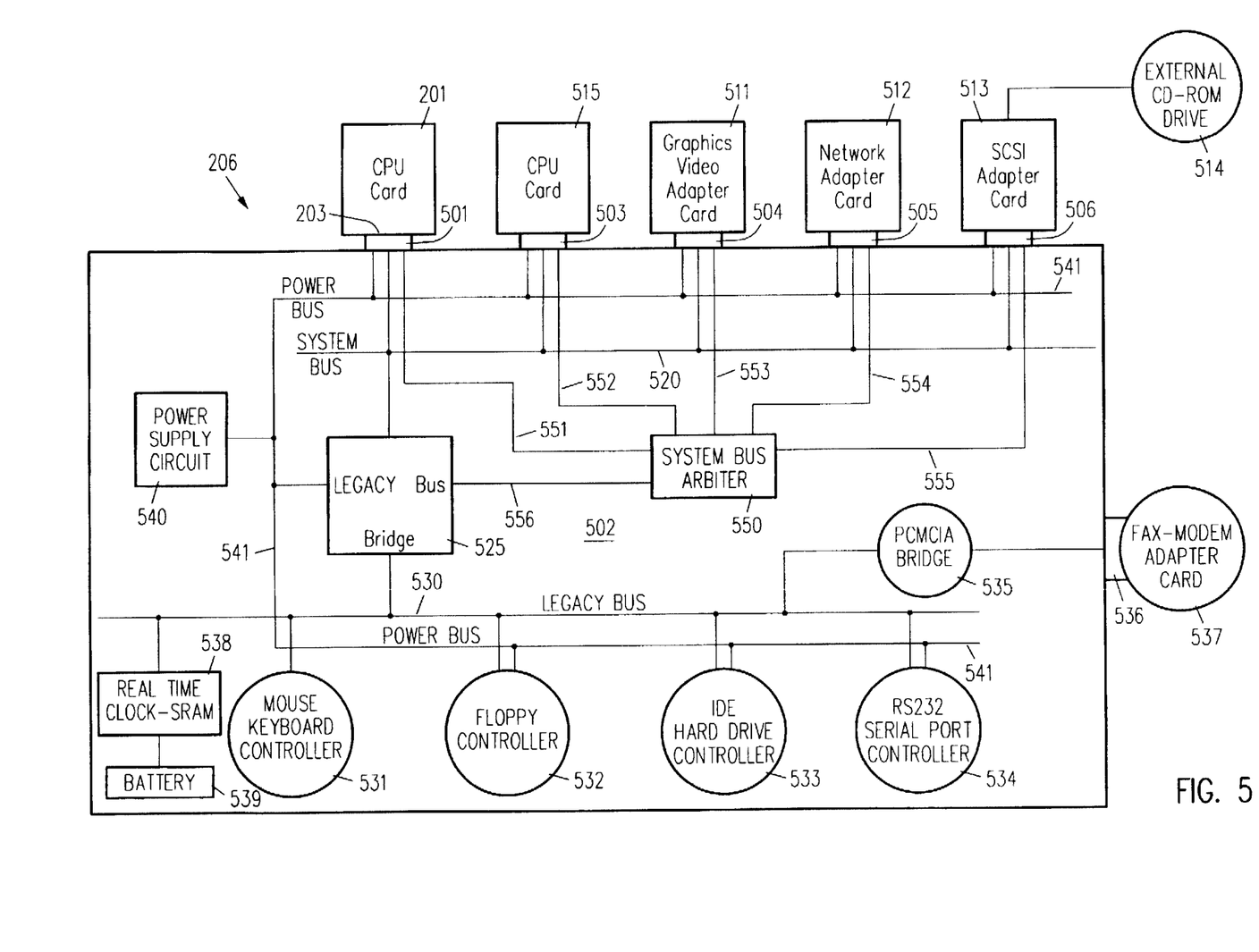
FIG. 5 illustrates a high level system block diagram of various components in the notebook PC of FIG. 2B.

FIG. 5 illustrates in block diagrams, the use of CPU card 201 in notebook PC 206. As noted above, a user physically inserts CPU card 201 into the bay behind slot 204 (FIG. 2B) until connector 203 is detachably connected to connector 501 (FIG. 5) of system board 502 that is a printed circuit board in one embodiment. System board 502 has a number of connectors 503–506, in addition to connector 501, and any one of these connectors 501, 503–506 (that comprise a number of pins in this embodiment), can be detachably connected to a connector of a user-removable card, such as CPU card 201.

In the embodiment illustrated in FIG. 5, socket connector 203 of CPU card 201 is connected to connector 501. Also, a number of user-removable resource cards 511–513 that contain various system resources of notebook PC 206 are connected to connectors 504–506 respectively. Each of user-removable resource cards 511–513 conforms to the SPCI Specification referenced above.

In this embodiment, user-removable resource cards 511–513 are respectively a graphics video adapter card, a wireless network adapter card and a SCSI host adapter card. Resource cards can also be connected (either detachably or permanently) to peripherals as illustrated, for example, by the coupling of SCSI host adapter card 513 to an external CD-ROM drive 514. In addition to CPU card 201, in one embodiment a user can optionally detachably connect additional CPU cards as illustrated, for example, by CPU card 515 detachably connected to connector 503. Therefore notebook PC 206 allows a user to simultaneously run two application programs, one on CPU card 201 and the other on CPU card 515.

As the manufacturer specific architecture of a CPU within a CPU card is isolated by a corresponding bus bridge memory controller in the CPU card, CPU card 201 can have a CPU of an architecture different from the architecture of the CPU in CPU card 515. In such a case, a first application can be, for example, a Windows™ application while a second application can be, for example, a Macintosh™ application, with the user being able to switch between the two applications using a keystroke or some other switch mechanism. The signal from such a keystroke can be used by an interrupt handler in one of CPU cards 201 and 515 to transfer control of system resources such as graphics video adapter card 511 between each other.

In one specific embodiment, a controlling CPU (e.g. CPU 402 in CPU card 201 that currently controls system resources) has an interrupt handler that responds to a signal from a switch mechanism by sending a redirection signal to bridge 525 that causes bridge 525 to redirect communications (including interrupt signals) from legacy components 531–534 to a non-controlling CPU (e.g. a CPU in CPU card 515 can be specified in the redirection signal).

Moreover, a user can use two CPU cards containing CPUs of the same architecture to run two applications, for example to watch a movie or play a video game using one CPU while using the other CPU to do for example, one or more number-crunching tasks, such as recalculating a spreadsheet.

Each of connectors 501 and 503–506 are connected to each other by a system bus 520, that is formed of electrical conductors, such as metal traces formed in system board 502. In one embodiment, system bus 520 is a peripheral component interconnect (PCI) bus as described in the PCI Specification referenced above. System bus 520 is coupled by a legacy bus bridge 525 to a legacy bus, such as an industry standard architecture (ISA) bus 530. In this embodiment, ISA bus 530 is in turn coupled to various legacy components that are components in conformance with the IBM™ PC AT industry standard. Such legacy components include, for example, a mouse-keyboard controller 531, a floppy controller 532, a IDE hard drive controller 533 and a RS232 serial port controller 534. Mouse-keyboard controller 531 is compatible with Intel 8042 that is programmed to support the IBM™ personal computer AT keyboard serial interface. Legacy bus bridge 525 includes Intel™ 8254, 8259A and 8237 that are connected together in a manner well known to a person skilled in the art of computer engineering.

Although several components, such as IDE hard drive controller 533, are illustrated connected to legacy bus 530, some or all system resources can be connected to system bus 520 in other embodiments, thereby eliminating legacy bus 580 and legacy bus bridge 525. In this embodiment, legacy bus 530 is also formed as a number of metal traces in system board 502, and is coupled to a PCMCIA bridge 535 that is coupled to a PCMCIA socket connector 536. PCMCIA socket connector 536 can be connected to a user-removable resource card, such as PCMCIA fax-modem adapter card 537. System board 502 also includes a real time clock-SRAM 538 (Motorola MC146818), powered by a battery 539.

Also supported by system board 502 is a power supply circuit 540 that supplies power via power bus 541 to various components of notebook PC 206, such as controllers 531–534, user-removable resource cards 511–513, 537, user-removable CPU cards 201, 515 and bridges 525 and 535. Power bus 541 supplies power to user-removable cards 201, 511–513 and 537 through contacts +5V, +12V, +3.3V and −12V (Table 2) of card connectors (e.g. 203) coupled to connectors 501, 503–506 and 536 of system board 502.

In one embodiment, system board 502 determines power needs of a user-removable card having signal definitions illustrated in Table 2 above. System board 502 senses the signals at pin contacts corresponding to socket contacts PRSNT1# and PRSNT2# that indicate whether a user-removable card is physically present in a slot (e.g. slot 204) and if so, the total power requirements, as illustrated below in Table 3.

TABLE 3

| PRSNT1# | PRSNT2# | Power Needed |
|---|---|---|
| Open | Open | No user-removable card |
| Ground | Open | 10 W (max) |
| Open | Ground | 5 W (max) |
| Ground | Ground | 2 W (max) |

In this embodiment, system board 502 supplies power to connector 203 through power rails +5V, +3.3V, +12V and −12V as noted above, which power is then supplied to various parts of user-removable CPU card 201.

System board 502 can also include, as an optional feature, system bus arbiter 550 that arbitrates the use of system bus 520 among the CPU and various system resources. System bus arbiter 550 is connected by arbiter lines 551–556 to CPU cards 201, 515 and resource cards 511–513. Each of arbiter lines 551–556 includes in this embodiment a request line coupled to contact REQ# (Table 2), a grant line coupled to contact GNT# and a device select line coupled to contact IDSEL. In one embodiment, system bus arbiter 550 implements the arbitration protocol described in the PCI Specification referenced above to allow various agents to use system bus 520. Moreover in this embodiment system bus arbiter 550 also drives signals on the device select lines to allow a CPU 402 in CPU card 201 to send configuration commands to e.g. cards 511–513.

Once CPU card 201 has been properly connected to system board 502 via connectors 203 and 501, notebook PC 206 can be powered on and operated to perform various prior art functions, such as spread sheet computations that are selected by a user. Following power-up, notebook PC 206 executes the steps illustrated in the flow chart of FIG. 6.

Figure 6:
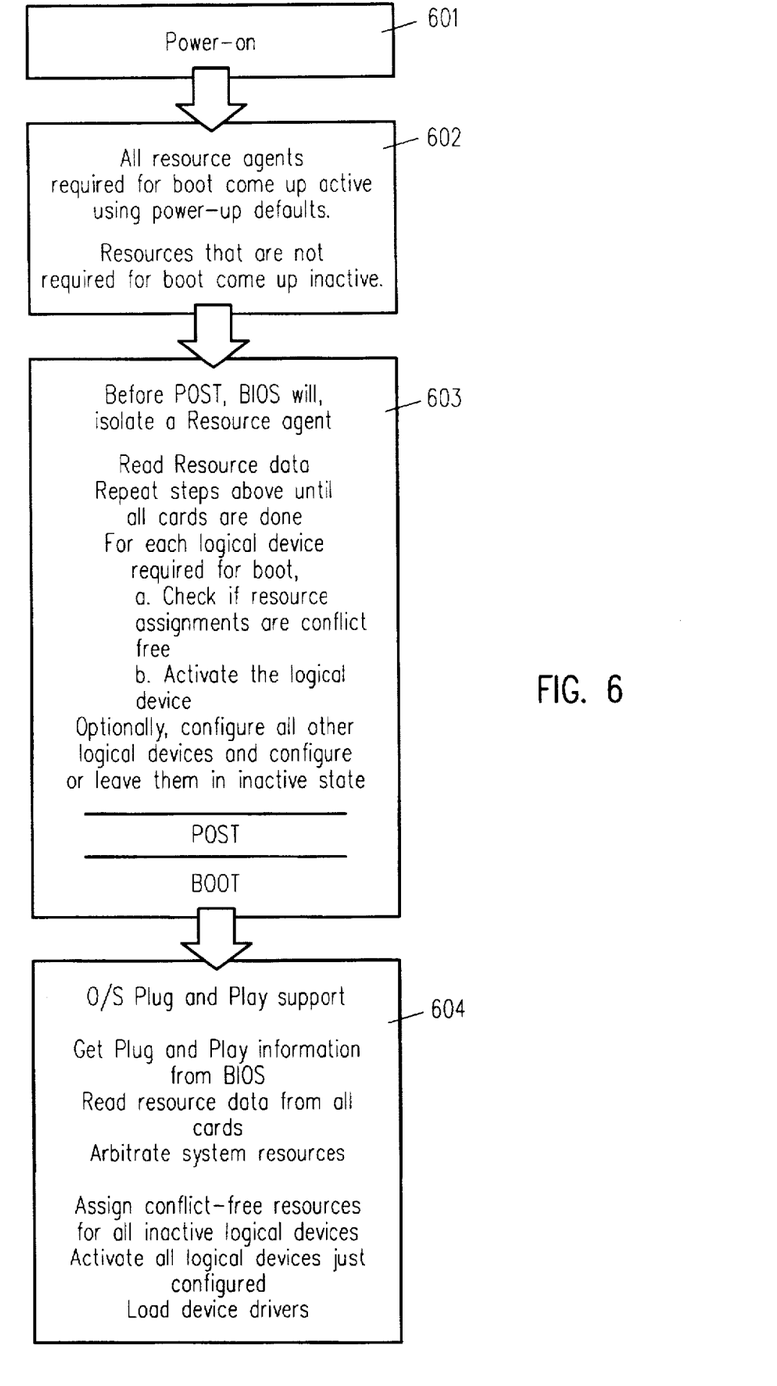
FIG. 6 illustrates various steps performed by the central processing unit of a user-removable CPU card on receipt of power from an electrical device in accordance with this invention.

In step 601, notebook PC 206 is powered up and power supply circuit 540 supplies power to each of the components in notebook PC 206. In step 602, all entities that operate on system bus 520, such as user-removable resource cards 511–513, and legacy bus bridge 525 that are required for boot come up active (i.e. enabled) using power-up defaults. Each of these entities then waits for instructions from a central processing unit. Other components, such as controllers 531–534, PCMCIA-ISA bridge 535 and fax-modem adapter card 537 that are not required for boot come up inactive (i.e. disabled).

On receipt of power, for example through connector 203, CPU 402 inside CPU card 201 executes step 603, e.g., basic-input-output-system (BIOS) instructions encoded in ROM 404, to perform a number of configuration functions.

CPU 402 isolates an active resource, such as graphics video adapter card 511, and reads resource requirements data and optionally BIOS instructions from a read-only-memory in the isolated resource. In alternative embodiments, CPU 402 uses different techniques for reading the resource requirements data. For example, in one embodiment in conformance with the "Plug and Play ISA Specification", version 1.0a, May 5, 1994, available from Microsoft Corporation, One Microsoft Way, Redmond, Wash. 98052-6399, CPU 402 broadcasts an initiation key on system bus 520 that places all enabled resources in a configuration mode. In this embodiment CPU 402 the performs an isolation protocol and reads the resource requirements data from each enabled active resource and saves this data. In another embodiment in conformance with the PCI Specification, referenced above, CPU 402 (1) causes bus bridge memory controller 403 to issue configuration commands on system bus 520, including driving IDSEL signals on arbiter lines 551–556 that uniquely identify each enabled resource and (2) reads and saves the resource requirements data.

CPU 402 repeats the steps described above for each system resource required for boot. For each boot system resource, CPU 402 checks for conflicts in resource assignments, if necessary assigns conflict free resources and activates the boot system resources. Conflicts can arise, for example if two different system resources, e.g. cards 512 and 513 use in their default modes the very same direct-memory-access (DMA) channel (e.g. channel 3) or the very same interrupt request line (e.g. line INTA#). In such a case, CPU 402 commands one of the system resources to use a different DMA channel or interrupt request line that is conflict-free.

Then CPU 402 optionally configures all other components, such as legacy bus bridge 525 and controllers 531–534. Then, CPU 402 performs power-on self test (POST) followed by booting the operating system, for example, from a hard drive that is controlled by IDE hard drive controller 533.

Then in step 604 CPU 402 executes operating system instructions. CPU 402 initially retrieves the resource requirements data read and saved earlier. Then after reading the resource requirements data from the disabled resource cards, CPU 402 checks for conflicts, assigns conflict free resources to the disabled components and activates these disabled components. Then CPU 402 loads various device drivers necessary for controlling various system resources, such as the modem in fax-modem card 537. The device drivers also include interrupt handlers, to process interrupts, for example from mouse-keyboard controller 531.

In one embodiment, bus bridge memory controller 403 is a programmable logic device or gate array device (e.g. FPGA) that includes a memory control unit 701 (FIG. 7), a bus interface unit 702 and a resource control unit 703, each of which is connected to bus 704 that is in turn connected through terminals 704A, 704D and 704C, CPU bus 420 and terminals 402A, 402D and 402C to CPU 402. Bus interface unit 702 is connected to bridge bus 705 that is in turn connected through terminals 705AD and 705C and bus 435 (including address-data bus 435AD and control bus 435C) to connector 203. In this embodiment, the same lines 435AD are used for address signals and for data signals.

Figure 7:
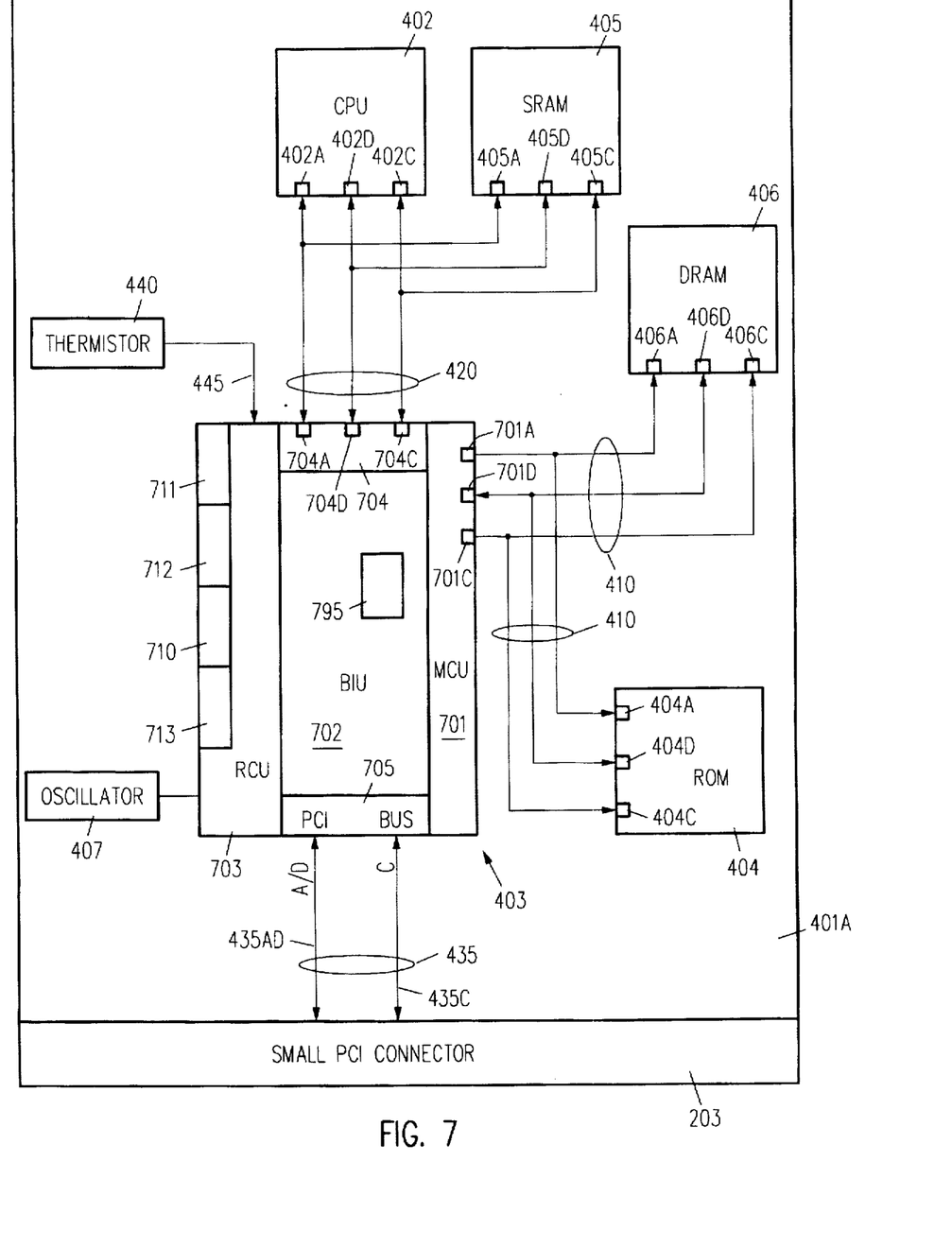
FIG. 7 illustrates in block diagram various components of a bus bridge memory controller in a user-removable CPU card.

Bus interface unit 702 routes all addresses from bus 704 by default to bus 705, unless they are decoded by the resource control unit 703 as described below.

In this embodiment, bus interface unit 702 can function as a PCI master and provide several central resource functions, such as required signal pullups or keepers, generation of individual resource selection signal (e.g. signal IDSEL) receiving a system error signal (e.g. signal SERR#), and driving a reset signal (e.g. signal RST#). Bus interface unit 702 parks itself on PCI bus 520 (FIG. 5) at the lowest priority, to provide minimum latency for CPU initiated cycles on bus 520. In one specific embodiment, as an optional feature bus interface unit 702 can provide bus master arbitration for a number of external bus masters (such as five bus masters). In one of these embodiments, bus interface unit 702 can implement a fixed or rotating priority algorithm. In other embodiments, bus arbitration can be performed by an external system bus arbiter 550 described above. Moreover, bus interface unit 702 provides all pull-ups and keepers for PCI bus signals. Bus interface unit 702 also assures that no PCI bus signals "float" undriven.

Bus interface unit 702 can also function as a slave or a target to allow external PCI masters to read and write to main memory 406 controlled by memory control unit 701. Bus interface unit 702 functions as a PCI target device, during other PCI master accesses to main memory connected to memory control unit 701.

Resource control unit 703 provides a common interface to various peripherals residing in the address space of CPU 402, including, for example mouse-keyboard controller 531 coupled to legacy bus 530. Legacy bus bridge 525 uses a subtractive decode on PCI bus 520 to decode addresses of legacy components such as floppy controller 532. In one specific embodiment, as an optional feature, resource control unit 703 can include a clock controller 710 that drives a clock signal on a clock line CLK of PCI bus 520 and so determines the cycle timing of PCI bus 520. In other embodiments a clock controller resident on system board 502 supplies the clock signal on clock line CLK.

Resource control unit 703 also includes a number of configuration registers 711 that provide a uniform method of accessing various PCI configuration parameters such as latency timer, burst and dwell lengths and cache line that are set to default values of: 40h clock cycles, disable, disable and 4 respectively. Such default values allow CPU 402 to correctly execute configuration instructions encoded in ROM 404 when CPU 402 exits reset, for example on power-up.

In one embodiment, resource control unit 703 also includes an interrupt translator 712 that ORs active signals on interrupt lines of PCI bus 520 (for example on lines INTA#. . . INTD#) into a single interrupt line of CPU bus 420 that is connected to one of control terminals 402C of CPU 402. In one specific embodiment, interrupt translator 712 maps interrupts from legacy bus bridge 525 as well as interrupts from either of resource cards 512 and 513 to the same interrupt line of CPU bus 420. Interrupt translator 712 can identify a system resource that originated an interrupt in response to a query from an interrupt handling routine executed by CPU 402. Interrupt translator 712 can also prioritize all pending interrupts.

Interrupt translator 712 can also process an active signal on an error line SERR# that is one of lines 435C and that indicates the occurrence of an error in one of the components of notebook PC 206. In response to an active signal on line SERR#, interrupt translator 712 can drive a signal active on a non-maskable interrupt (NMI) line that is one of control lines of CPU bus 420 connected to CPU 402 at one of control terminals 402C. A system resource may drive the signal on line SERR# active, for example, if a transaction terminates abnormally, or if the resource enters an unexpected or unknown state. In response to such an active signal on an NMI interrupt line, CPU 402 can display an error message on display 210.

Resource control unit 703 also includes a thermal monitor 713 for monitoring the signal on temperature line 445 as described above and to slow the clock signal supplied at one of control terminals 402C.

In one specific embodiment, memory control unit 701 supports a 64-bit or 32-bit data path to DRAM 406 (FIG. 4C) and 8-bit or 16-bit data path to ROM 404 (FIG. 4A). Also, in one embodiment, memory control unit 701 operates synchronously with respect to CPU 402 and bus interface unit 702, to ensure maximum performance for all transfers to DRAM 405. In another embodiment, memory control unit 701 operates asynchronously with respect to CPU 402 and bus interface unit 702, which provides flexibility in the clock speeds of CPU 402 and system bus 520. In one embodiment, bus interface unit 702 includes first-in-first-out (FIFO) memories that buffer the signals received from CPU bus 420 and system bus 520 in view of different speeds of the respective clocks.

In one embodiment, memory control unit 701 distinguishes between ROM 404 and DRAM 405 by driving signals active on corresponding chip select lines that are included in memory bus 410.

Bus bridge memory controller 403 also allows CPU 402 to interface to a cache memory 405 (SRAM chips S1-SN) through CPU bus 420. A cache controller 795 in bus bridge memory controller 403 identifies writes to the main memory 406 that originate on the system bus 520, for example, during bus master access operations (e.g. DMA), and invalidates corresponding locations in cache memory 405, to ensure consistency of the data. Data consistency can be implemented by one of various data coherency protocols such as MESI or Dragon.

In view of the enclosed description, a person of skill in the art can build a user-removable CPU card and a notebook PC for using such a CPU card.

Numerous modifications and adaptations of the embodiments described herein are encompassed within the broad scope of this invention. For example, although a user-removable CPU card is illustrated for use in a notebook PC 206, in other embodiments of this invention user-removable CPU cards can be used in other PCs such as desktop PCs, laptop PCs, and also in other electrical devices that have for example embedded controllers. Moreover, although certain operating system instructions have been described above in reference to step 604, other operating system instructions can be executed by CPU 402 in accordance with this invention. Furthermore, although only one power supply circuit 540 is illustrated in system board 502, there can be other power supply circuits to supply power to various components of an electrical device.

Various modifications and adaptations of the embodiments described herein are encompassed by the attached claims.

I claim:

1. A user-removable CPU card comprising:
   a substrate having a width approximately the width of a credit card;
   a bus bridge memory controller supported by said substrate, said bus bridge memory controller comprising a bus interface unit;

a central processing unit supported by said substrate, said central processing unit being electrically coupled to said bus bridge memory controller;

read-only-memory supported by said substrate, said read-only-memory being electrically coupled by said bus bridge memory controller to said central processing unit;

a first connector supported by said substrate, said first connector being coupled by said bus bridge memory controller to said central processing unit;

dynamic random-access-memory said dynamic random-access-memory being supported by said substrate, said bus bridge memory controller further comprising a memory control unit, said memory control unit coupling said dynamic random-access-memory and said read-only-memory to said central processing unit; and a plurality of chip select lines coupled to said memory control unit, wherein said memory control unit distinguishes between said read-only-memory and said dynamic random-access-memory by driving a plurality of signals on said plurality of chip select lines;

wherein on insertion of said CPU card through an opening in a housing of an electrical device, said first connector is detachably and electrically coupled with a second connector of a system board enclosed by said housing;

wherein said system board supplies power to said CPU card through said second connector and said first connector on said insertion; and wherein said bus bridge memory controller passes a first address signal to said first connector on receipt of said first address signal from said central processing unit.

2. The user-removable CPU card of claim 1 further comprising static random-access-memory, said static random-access-memory being supported by said substrate, said static random-access-memory being directly connected to said central processing unit.

3. The user-removable CPU card of claim 1 wherein:

a first data path of a first length couples said memory control unit to said read-only-memory and a second data path of a second length couples said memory control unit to said dynamic random-access-memory.

4. The user-removable CPU card of claim 1 wherein said bus bridge memory controller further comprises a resource control unit coupled to said central processing unit, said resource control unit decoding a second address signal from said central processing unit to provide an interface to a peripheral addressed by said second address signal.

5. The user-removable CPU card of claim 2 wherein:

said bus bridge memory controller further comprises a cache controller coupled to said static random-access-memory, said dynamic random-access-memory and said first connector; and said cache controller invalidates a location in said static random-access-memory in response to a write command from said first connector to a corresponding location in said dynamic random-access-memory.

6. The user-removable CPU card of claim 3 wherein said second length is a multiple of said first length.

7. The user-removable CPU card of claim 4 further comprising an oscillator coupled to said resource control unit, and said resource control unit comprises a clock controller for generating a clock signal.

8. The user-removable CPU card of claim 4 wherein said resource control unit comprises a plurality of configuration registers for supplying a corresponding plurality of default values to said central processing unit.

9. The user-removable CPU card of claim 4 wherein said resource control unit comprises an interrupt translator that ORs active signals from a plurality of interrupt lines into a single interrupt line, said single interrupt line being coupled to said central processing unit.

10. The user-removable CPU card of claim 4 further comprising a temperature line and a thermistor coupled by said temperature line to said resource control unit, and said resource control unit comprises a thermal monitor for monitoring a signal on said temperature line.

11. A user-removable CPU card comprising:

a substrate having a width approximately the width of a credit card;

a circuit supported by the substrate, the circuit comprising a bus interface unit;

a central processing unit supported by the substrate, the central processing unit being electrically coupled to the circuit;

a first connector supported by the substrate, the first connector being coupled by the circuit to the central processing unit, read-only-memory supported by the substrate, the read-only-memory being encoded with basic-input-output-system (BIOS) instructions;

a memory control unit included in the circuit; and a memory bus that electrically couples the memory control unit to the read-only-memory, the memory bus including a chip select line;

wherein the memory control unit drives a signal active on the chip select line thereby to retrieve the BIOS instructions for execution by the central processing unit;

wherein on insertion of the CPU card through an opening in a housing of an electrical device, the first connector is detachably and electrically coupled with one of a plurality of connectors of a system board enclosed by the housing; and wherein the circuit passes a first address signal to the first connector on receipt of the first address signal from the central processing unit.

12. The user-removable CPU card of claim 11 wherein the CPU and the circuit are formed together as a single integrated circuit.

13. The user-removable CPU card of claim 11, wherein the circuit is coupled by a Peripheral Component Interconnect bus to the first connector and the circuit includes a central resource of the Peripheral Component Interconnect bus.

14. The user-removable CPU card of claim 11 wherein the circuit is physically located between the first connector and the central processing unit.

15. The user-removable CPU card of claim 11 further comprising:

a resource control unit included in the circuit and coupled to the central processing unit; and a thermistor coupled to the resource control unit, wherein the resource control unit monitors a signal from the thermistor indicative of temperature of the CPU card.

* * * * *